(12) United States Patent
Katou et al.

(10) Patent No.: US 10,166,950 B2
(45) Date of Patent: Jan. 1, 2019

(54) ELECTRONIC KEY SYSTEM, ONBOARD APPARATUS, AND PORTABLE APPARATUS

(71) Applicant: DENSO CORPORATION, Kariya, Aichi-pref. (JP)

(72) Inventors: Kenji Katou, Kariya (JP); Yuuki Tokunaga, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 122 days.

(21) Appl. No.: 15/029,155

(22) PCT Filed: Sep. 25, 2014

(86) PCT No.: PCT/JP2014/004898
§ 371 (c)(1),
(2) Date: Apr. 13, 2016

(87) PCT Pub. No.: WO2015/056410
PCT Pub. Date: Apr. 23, 2015

(65) Prior Publication Data
US 2016/0236653 A1 Aug. 18, 2016

(30) Foreign Application Priority Data
Oct. 17, 2013 (JP) ................................ 2013-216628

(51) Int. Cl.
*H04L 29/00* (2006.01)
*B60R 25/24* (2013.01)
(Continued)

(52) U.S. Cl.
CPC ............ *B60R 25/248* (2013.01); *B60R 25/24* (2013.01); *G07C 9/00007* (2013.01);
(Continued)

(58) Field of Classification Search
CPC .......................... H04L 9/0819; B60R 25/248
(Continued)

(56) References Cited

U.S. PATENT DOCUMENTS 6,058,476 A 5/2000 Matsuzaki et al.
2005/0052276 A1 3/2005 Kumazaki et al.
(Continued)

FOREIGN PATENT DOCUMENTS

JP H10143695 A 5/1998
JP 2000286830 A 10/2000
(Continued)

OTHER PUBLICATIONS

International Search Report and Written Opinion (in Japanese with English Translation) for PCT/JP2014/004898, dated Dec. 9, 2014; ISA/JP.

*Primary Examiner* — Brandon S Hoffman
*Assistant Examiner* — Michael D Anderson
(74) *Attorney, Agent, or Firm* — Harness, Dickey & Pierce, P.L.C.

(57) ABSTRACT

An electronic key system includes an onboard apparatus and a portable apparatus. The electronic key system establishes wireless communication with a secret key common between the onboard apparatus and the portable apparatus, and authenticates the portable apparatus registered as the portable apparatus of an authorized user. The portable apparatus includes a portable apparatus code transmitter that transmits a portable apparatus code. The onboard apparatus includes an onboard code transmitter that transmits an onboard code. The onboard apparatus further includes a portable apparatus code receiver, and an onboard-side key generation portion. The portable apparatus further includes an onboard code receiver, and a portable-apparatus-side key generation portion.

6 Claims, 12 Drawing Sheets

(51) Int. Cl.
*H04L 9/32* (2006.01)
*H04L 9/08* (2006.01)
*G07C 9/00* (2006.01)
*H04W 12/04* (2009.01)
*H04W 4/04* (2009.01)
*H04L 29/06* (2006.01)

(52) U.S. Cl.
CPC .......... *H04L 9/0819* (2013.01); *H04L 9/0844* (2013.01); *H04L 9/3271* (2013.01); *H04W 4/046* (2013.01); *H04W 12/04* (2013.01); *G07C 9/00309* (2013.01); *G07C 2009/00412* (2013.01); *G07C 2009/00769* (2013.01); *H04L 63/0428* (2013.01); *H04L 2209/84* (2013.01)

(58) Field of Classification Search
USPC .......................................................... 380/270
See application file for complete search history.

(56) References Cited

U.S. PATENT DOCUMENTS

| | | | |
|---|---|---|---|
| 2010/0321173 A1* | 12/2010 | Magner | G07C 9/00182 340/426.1 |
| 2013/0212704 A1* | 8/2013 | Shablygin | G06F 21/6218 726/28 |

FOREIGN PATENT DOCUMENTS

| | | |
|---|---|---|
| JP | 2005083011 A | 3/2005 |
| JP | 2007049759 A | 2/2007 |
| JP | 2011101118 A | 5/2011 |
| JP | 2013157893 A | 8/2013 |
| WO | WO-2013114972 A1 | 8/2013 |

* cited by examiner

ELECTRONIC KEY SYSTEM, ONBOARD APPARATUS, AND PORTABLE APPARATUS

CROSS REFERENCE TO RELATED APPLICATIONS

This application is a U.S. National Phase Application under 35 U.S.C. 371 of International Application No. PCT/JP2014/004898 filed on Sep. 25, 2014 and published in Japanese as WO 2015/056410 A1 on Apr. 23, 2015. This application is based on and claims the benefit of priority from Japanese Patent Application No. 2013-216628 filed on Oct. 17, 2013. The entire disclosures of all of the above applications are incorporated herein by reference.

TECHNICAL FIELD

The present disclosure relates to an electronic key system that performs authentication by establishing wireless communication between an onboard apparatus mounted to a vehicle and a portable apparatus carried by a user. The present disclosure also relates to an onboard apparatus and a portable apparatus, which are both included in the electronic key system.

BACKGROUND ART

Conventionally, an electronic key system establishes wireless communication between an onboard apparatus and a portable apparatus carried by a user. The electronic key system performs a predetermined operation, for example, to lock or unlock a door when an ID transmitted from the portable apparatus matches an ID that is preregistered in the onboard apparatus. In order to maintain security, an electronic key system adopts a common key cryptosystem as disclosed in Patent Literature 1. In the common key cryptosystem, the same secret key is used for both encryption and decryption.

This type of electronic key system is configured to register a portable apparatus so as to cope with an increase in the number of users by additionally registering an ID in the onboard apparatus or by changing an ID registered in the onboard apparatus. When the portable apparatus is registered, an ID for normal operations that is incorporated in the portable apparatus is also used as an ID that causes the onboard apparatus to recognize an authorized user.

The inventors of the present disclosure have found the following about an electronic key system. When an unauthorized user knows a cryptographic algorithm for the common key cryptosystem and is able to acquire an ID from a portable apparatus by using an illegal attack tool, it may be probable that the unauthorized user knows a secret key. When the unauthorized user knows the secret key, even the unauthorized user may be able to register a portable apparatus.

PRIOR ART LITERATURES

Patent Literature

Patent Literature 1: JP 2007-049759 A

SUMMARY OF INVENTION

It is an object of the present disclosure to provide an electronic key system, an onboard apparatus, and a portable apparatus that can provide increased security while suppressing changes in parts of the portable apparatus.

According to one example of the present disclosure, an electronic key system comprising an onboard apparatus that is mounted to a vehicle; and a portable apparatus that is carried by a user is provided. The electronic key system establishes wireless communication with a secret key common between the onboard apparatus and the portable apparatus, and authenticates the portable apparatus registered as the portable apparatus of an authorized user. The portable apparatus includes a portable apparatus code transmitter that transmits to the onboard apparatus a portable apparatus code unique to the portable apparatus. The onboard apparatus includes an onboard code transmitter that transmits to the portable apparatus an onboard code different from the portable apparatus code. The onboard apparatus further includes a portable apparatus code receiver that receives the portable apparatus code transmitted from the portable apparatus code transmitter of the portable apparatus when the portable apparatus of the authorized user is to be registered, and an onboard-side key generation portion that generates the secret key by a cryptographic algorithm common to the portable apparatus while using the onboard code and the portable apparatus code received by the portable apparatus code receiver. The portable apparatus further includes an onboard code receiver that receives the onboard code transmitted from the onboard code transmitter of the onboard apparatus when the portable apparatus of the authorized user is to be registered, and a portable-apparatus-side key generation portion that generates the secret key by the cryptographic algorithm common to the onboard apparatus while using the portable apparatus code and the onboard code received by the onboard code receiver.

According to the electronic key system, the secret key is generated by using both the portable apparatus code of the portable apparatus and the onboard code of the onboard apparatus. Therefore, the secret key remains unknown until the portable apparatus code and the onboard code are both acquired. The portable apparatus transmits only the portable apparatus code and not the onboard code. Therefore, an unauthorized user cannot acquire the onboard code even when the unauthorized user uses an attack tool to acquire the portable apparatus code transmitted from the portable apparatus. Consequently, even when an unauthorized user uses an attack tool, the unauthorized user can acquire the portable apparatus code only. Hence, the unauthorized user cannot acquire the secret key. Without the secret key, the unauthorized user cannot register an illegal portable apparatus.

According to a configuration for enabling the portable apparatus to receive the onboard code and generate the secret key by using both the portable apparatus code and the onboard code, it may be possible to be easily implemented by applying the onboard apparatus and the portable apparatus having a conventional configuration to software changes. It may be possible to improve security while suppressing changes in parts of the portable apparatus.

Moreover, the present disclosure provides the onboard apparatus and the portable apparatus that are used in the electronic key system. It may be possible to improve security while suppressing changes in the parts of the portable apparatus.

BRIEF DESCRIPTION OF DRAWINGS

The above and other aspects, features and advantages of the present disclosure will become more apparent from the following detailed description made with reference to the accompanying drawings. In the drawings.

EMBODIMENTS FOR CARRYING OUT INVENTION

Embodiments of the present disclosure will be described with reference to the drawings.

(First Embodiment)

Figure 1:
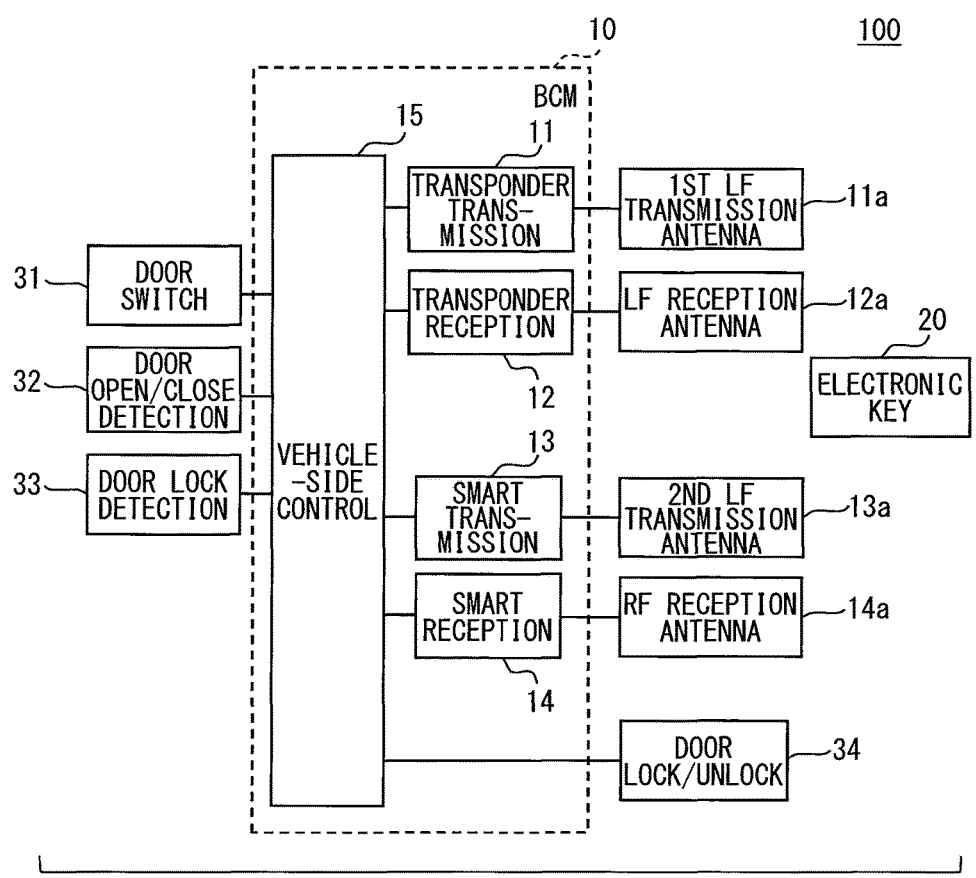
FIG. 1 is a diagram schematically illustrating an exemplary configuration of an electronic key system.

FIG. 1 is a schematic diagram illustrating an exemplary configuration of an electronic key system 100. The electronic key system 100 illustrated in FIG. 1 includes a body control module (referred to as a BCM) 10, which is mounted to a vehicle, and an electronic key 20, which is carried by a user. The BCM 10 corresponds to an onboard apparatus of the present disclosure. The electronic key 20 corresponds to a portable apparatus of the present disclosure. The electronic key system 100 has a smart function and a transponder function, as is the case with a conventional electronic key system.

The smart function performs a code collation by establishing a wireless communication between the BCM 10 and the electronic key 20. When the code collation is successful, the smart function exercises a vehicle door lock control or a vehicle door unlock control or permits the vehicle to start.

The transponder function enables the electronic key 20 to wirelessly communicate with the BCM 10 by power based on a LF band inductive coupling when a battery of the electronic key 20 is dead, and performs the code collation through the wireless communication. When the code collation is successful, the transponder function permits the vehicle to start. Wireless communication established when the smart function is executed is referred to as a smart communication. Wireless communication established when the transponder function is executed is hereinafter referred to as a transponder communication.

As illustrated in FIG. 1, the BCM 10 includes a transponder transmitter 11, a transponder receiver 12, a smart transmitter 13, a smart receiver 14, and a vehicle-side controller 15.

The transponder transmitter 11 is connected to a first LF transmission antenna 11a, which acts as a transmission antenna for transponder communication. The transponder transmitter 11 receives a signal inputted from the vehicle-side controller 15, and transmits the received signal from the first LF transmission antenna 11a through the LF band electrical wave. The signal may be transmitted, for example, using 125 kHz band electrical wave. The transponder transmitter 11 includes a power feed function, and functions as a power feed mechanism.

The transponder receiver 12 is connected to an LF reception antenna 12a, which acts as a reception antenna for transponder communication. The transponder receiver 12 performs processing such as amplification, demodulation, or the like to a signal received by the LF reception antenna 12a.

The first LF transmission antenna 11a and the LF reception antenna 12a may be disposed, for example, near an engine switch or a key cylinder, which is disposed in a vehicle compartment, so that the transponder communication is established only when the electronic key 20 is positioned near the engine switch or the key cylinder.

The smart transmitter 13 is connected to a second LF transmission antenna 13a, which acts as transmission antenna for smart communication. For the sake of convenience, FIG. 1 shows only one second LF transmission antenna 13a. However, multiple second LF transmission antennas 13a are provided, for example, near a-side door or in a trunk. The smart transmitter 13 receives a signal inputted from the vehicle-side controller 15 and transmits the received signal from the second LF transmission antenna 13a through LF band electrical wave. The signal may be transmitted, for example, through 125 kHz band electrical wave.

The smart receiver 14 is connected to an RF reception antenna 14a, which acts as a reception antenna for smart communication. The smart receiver 14 performs a processing such as amplification, demodulation, or the like, to a signal received by the RF reception antenna 14a.

The vehicle-side controller 15 includes, as a main body, a microcomputer that includes a CPU, a ROM, a RAM, a backup RAM, and an I/O device (these components are not shown). The vehicle-side controller 15 performs various processes by executing various control programs stored in the ROM. The vehicle-side controller 15 is connected to the transponder transmitter 11, the transponder receiver 12, the smart transmitter 13, the smart receiver 14, a door switch 31, a door open-and-close detector 32, a door lock detector 33, and a door lock-and-unlock unit 34.

Figure 2:
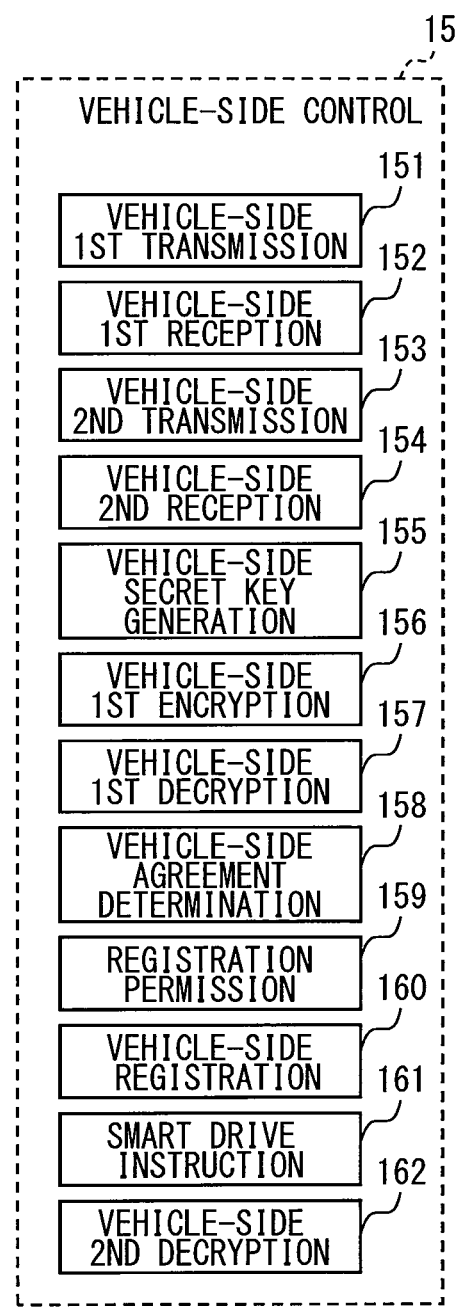
FIG. 2 is a functional block diagram schematically illustrating an exemplary configuration of a vehicle-side controller.

As illustrated in FIG. 2, the vehicle-side controller 15 includes various functional blocks. The vehicle-side controller 15 includes a vehicle-side first transmission processor 151, a vehicle-side first reception processor 152, a vehicle-side second transmission processor 153, a vehicle-side second reception processor 154, a vehicle-side secret key generation portion 155, a vehicle-side first encryptor 156, a vehicle-side first decryptor 157, a vehicle-side agreement determinator 158, a registration permission portion 159, a vehicle-side registration portion 160, a smart drive instructor 161, and a vehicle-side second decryptor 162.

The door switch 31 is a touch switch disposed near a door knob for opening and closing a vehicle door or is a touch switch disposed near a door knob for a vehicle trunk door.

A signal indicative of a user operation performed on the door switch 31 is outputted to the vehicle-side controller 15.

The door open-and-close detector 32 is a switch that detects whether a vehicle door or a trunk door is opened or closed. A signal indicative of whether a vehicle door or a trunk door is opened or closed is outputted from the door open-and-close detector 32 to the vehicle-side controller 15.

The door lock detector 33 is a switch that detects whether a vehicle door or a trunk door is locked. A signal indicative of whether a vehicle door or a trunk door is locked is outputted from the door lock detector 33 to the vehicle-side controller 15.

The door lock-and-unlock unit 34 includes an actuator that locks or unlocks a vehicle door or a trunk door. The door lock-and-unlock unit 34 locks or unlocks a vehicle door or a trunk door by driving the actuator.

The electronic key 20 will be described with reference to FIG. 3. The electronic key 20 is carried by a user. The expression "carried by a user" not only represents a case where the electronic key 20 is actually carried by a user, but also represents a case where the electronic key 20 can be carried by a user but is not actually carried by the user.

Figure 3:
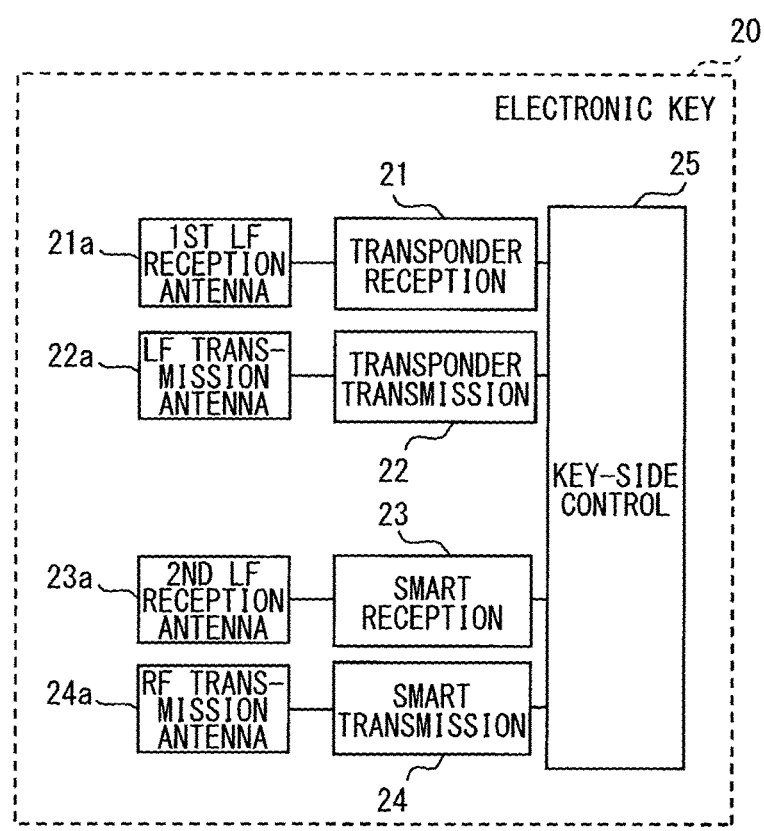
FIG. 3 is a diagram schematically illustrating an exemplary configuration of an electronic key.

As illustrated in FIG. 3, the electronic key 20 includes a first LF reception antenna 21a, a transponder receiver 21, an LF transmission antenna 22a, a transponder transmitter 22, a second LF reception antenna 23a, a smart receiver 23, an RF transmission antenna 24a, a smart transmitter 24, and a key-side controller 25. The electronic key 20 further includes a battery, a switch, an emergency key, and other common electronic key components. For the sake of convenience, components irrelevant to the description of the present disclosure will be omitted.

The transponder receiver 21 is connected to the first LF reception antenna 21a, which acts as a reception antenna for transponder communication. The transponder receiver 21 performs processing such as amplification, demodulation or the like, to a signal received by the first LF reception antenna 21a.

The transponder transmitter 22 is connected to the LF transmission antenna 22a, which acts as a transmission antenna for transponder communication. The transponder transmitter 22 receives a signal inputted from the key-side controller 25 and transmits the received signal from the LF transmission antenna 22a through a LF band electrical wave. The signal may be transmitted, for example, through 125 kHz band electrical wave.

The smart receiver 23 is connected to the second LF reception antenna 23a, which acts as a reception antenna for smart communication. The smart receiver 23 amplifies, demodulates, or otherwise processes a signal received by the second LF reception antenna 23a. The second LF reception antenna 23a may be a triaxial antenna that is oriented in two different horizontal directions and in a vertical direction.

The smart transmitter 24 is connected to the RF transmission antenna 24a, which acts as a transmission antenna for smart communication. The smart transmitter 24 receives a signal inputted from the key-side controller 25 and transmits the received signal from the RF transmission antenna 24a through UHF band electrical wave. The signal may be transmitted, for example, through 315 MHz band electrical wave.

The key-side controller 25 includes, as a main body, a microcomputer that includes a CPU, a ROM, a RAM, a backup RAM, and an I/O device (these components are not shown). The key-side controller 25 performs various processes by executing various control programs stored in the ROM. The key-side controller 25 is connected to the transponder receiver 21, the transponder transmitter 22, the smart receiver 23, and the smart transmitter 24.

Figure 4:
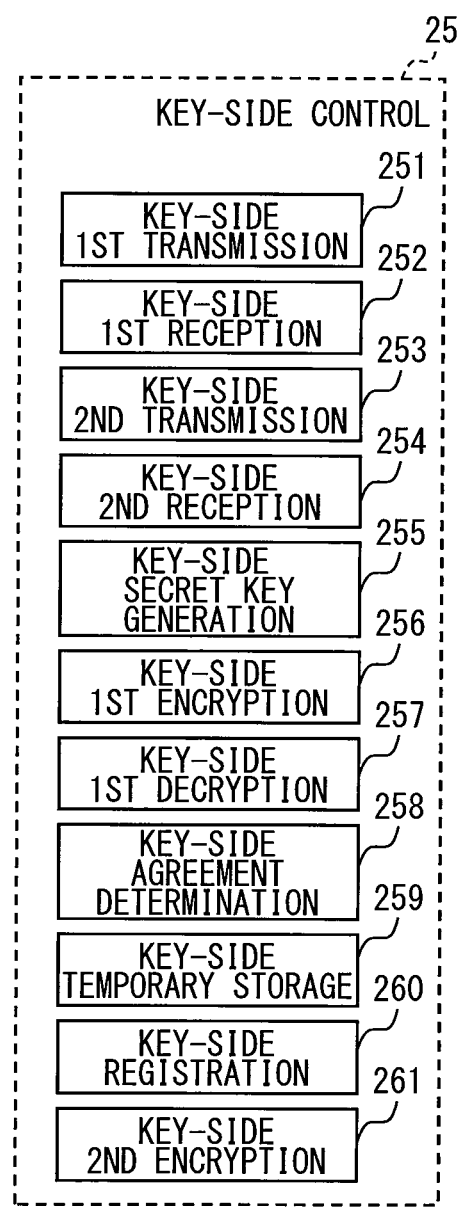
FIG. 4 is a functional block diagram schematically illustrating an exemplary configuration of a key-side controller.

As illustrated in FIG. 4, the key-side controller 25 includes various functional blocks. The key-side controller 25 includes a key-side first transmission processor 251, a key-side first reception processor 252, a key-side second transmission processor 253, a key-side second reception processor 254, a key-side secret key generation portion 255, a key-side first encryptor 256, a key-side first decryptor 257, a key-side agreement determinator 258, a key-side temporary storage 259, a key-side registration portion 260, and a key-side second encryptor 261.

In the code collation performed by the smart function of the electronic key system 100, the authentication is successful when the ID code transmitted from the electronic key 20 to the BCM 10 is registered in the BCM 10. In order to cope with an increase in the number of users, the electronic key system 100 registers the electronic key 20 with an additional ID code registered in the BCM 10

Figure 5:
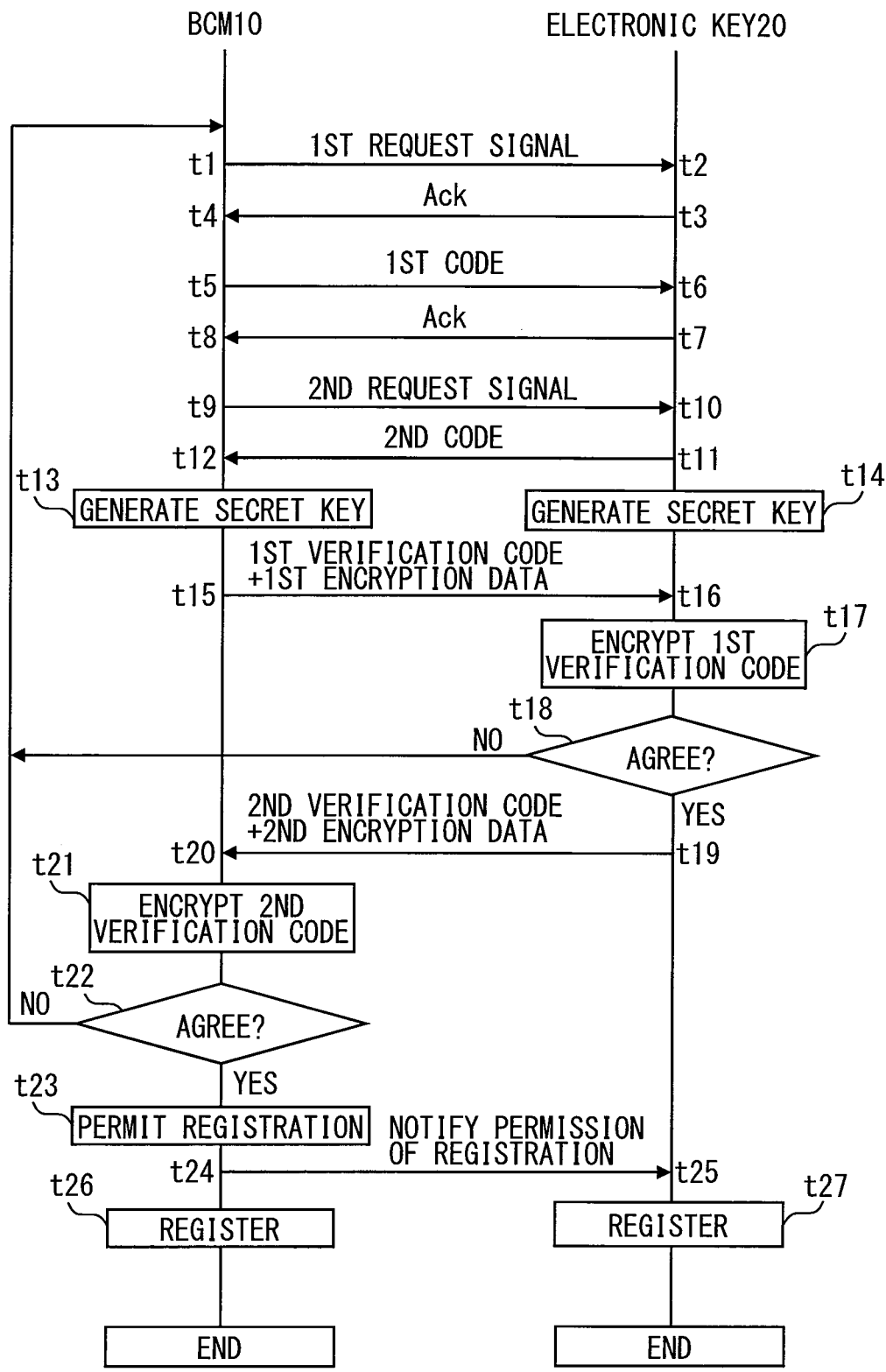
FIG. 5 is a sequence diagram illustrating an example of a registration related process according to a first embodiment.

An example of a process related to registration of the electronic key 20 (referred to as a registration related process) according to the first embodiment will be described with reference to FIG. 5. The example of FIG. 5 will be described on the assumption that registration is permitted by using the registered electronic key 20. Registration may be permitted by another method in which, for example, a dealer uses a dedicated tool. The registration related process illustrated in FIG. 5 is not only applicable to a case where the electronic key 20 is to be additionally registered, but also applicable to a case where the electronic key 20 is to be initially registered.

The vehicle-side first transmission processor 151 of the BCM 10 transmits a request signal (referred to as a first request signal) through the transponder transmitter 11 and the first LF transmission antenna 11a by the LF band electrical wave (t1). The key-side first reception processor 252 of the electronic key 20 receives the first request signal through the first LF reception antenna 21a and the transponder receiver 21 (t2).

When the key-side first reception processor 252 receives the first request signal, the key-side first transmission processor 251 transmits an Acknowledge (hereinafter referred to as an Ack) through the transponder transmitter 22 and the LF transmission antenna 22a through the LF band electrical wave (t3). The vehicle-side first reception processor 152 of the BCM 10 receives the Ack through the LF reception antenna 12a and the transponder receiver 12 (t4).

When the vehicle-side first reception processor 152 receives the Ack, the vehicle-side first transmission processor 151 transmits an ID code (hereinafter referred to as a first code) unique to the BCM 10 through the LF band electrical wave (t5). Thus, the first code corresponds to an onboard apparatus unique code and an onboard code according to the present disclosure. The process performed perform at t5 corresponds to an onboard code transmitter of the present disclosure. The first code stored, for instance, in a non-volatile memory of the vehicle-side controller 15 may be read and used. The key-side first reception processor 252 receives the first code (t6). The process performed at t6 corresponds to an onboard code receiver according to the present disclosure.

The first code received by the key-side first reception processor 252 is temporarily stored in the key-side temporary storage 259 of the electronic key 20. The key-side temporary storage 259 corresponds to a temporary storage according to the present disclosure. The key-side temporary storage 259 may be, for example, a volatile memory such as a RAM.

When the key-side first reception processor 252 receives the first code, the key-side first transmission processor 251 transmits the Ack through the LF band electrical wave (t7). The vehicle-side first reception processor 152 receives the Ack (t8). When the vehicle-side first reception processor 152 receives the Ack, the vehicle-side first transmission processor 151 transmits a request signal (hereinafter referred to as a second request signal) through the LF band electrical wave (t9). The key-side first reception processor 252 receives the second request signal (t10).

When the key-side first reception processor 252 receives the second request signal, the key-side first transmission processor 251 transmits an ID code (hereinafter referred to as a second code) unique to the electronic key 20 by the LF band electrical wave (t11). The second code corresponds to a portable apparatus code according to the present disclosure. The process performed at t11 corresponds to a portable apparatus code transmitter according to the present disclosure. The second code stored, for instance, in a non-volatile memory of the key-side controller 25 may be read and used. The vehicle-side first reception processor 152 receives the second code (t12). The process performed at t12 corresponds to a portable apparatus code receiver according to the present disclosure.

When the vehicle-side first reception processor 152 receives the second code, the vehicle-side secret key generation portion 155 of the BCM 10 generates a secret key for use in the common key cryptosystem (also referred to as a symmetric key encryption system) from the second code received by the vehicle-side first reception processor 152 and the first code stored in the non-volatile memory of the vehicle-side controller 15 (t13). In this instance, the secret key is generated by using a cryptographic algorithm (hereinafter referred to as a first cryptographic algorithm) common to the electronic key 20. The vehicle-side secret key generation portion 155 corresponds to an onboard-side key generation portion according to the present disclosure.

The key-side secret key generation portion 255 of the electronic key 20 generates a secret key for use in the common key cryptosystem from the first code temporarily stored in the key-side temporary storage 259 and the second code stored in the non-volatile memory of the key-side controller 25 (t14). In this case, the secret key is generated by using the first cryptographic algorithm common to the BCM 10. The key-side secret key generation portion 255 corresponds to a portable-apparatus-side key generation portion according to the present disclosure.

Figure 6:
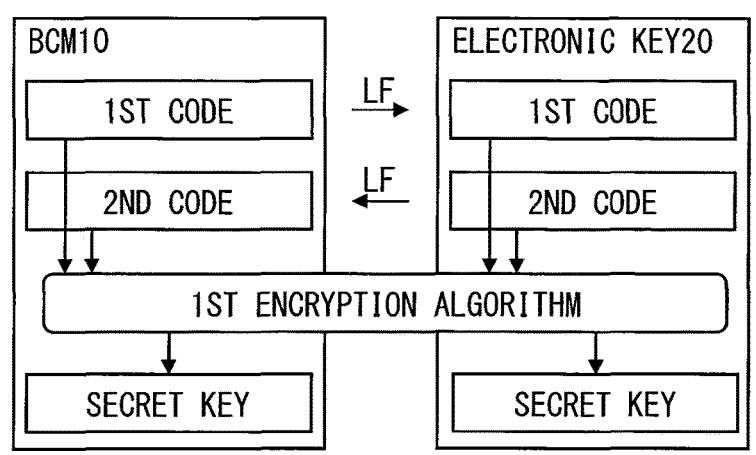
FIG. 6 is a diagram schematically illustrating an example of secret key generation by a BCM and an electronic key according to the first embodiment.

As illustrated in FIG. 6, the BCM 10 and the electronic key 20 both use the first code unique to the BCM 10 and the second code unique to the electronic key 20, and generate the secret key according to the common first cryptographic algorithm. FIG. 6 is a schematic diagram illustrating an example of secret key generation by the BCM 10 and electronic key 20 according to the first embodiment.

When the secret key is generated by the vehicle-side secret key generation portion 155, the vehicle-side first encryptor 156 encrypts a predetermined code for verification (hereinafter referred to as a first verification code) by using the secret key generated by the vehicle-side secret key generation portion 155. The vehicle-side first transmission processor 151 transmits the first verification code and data obtained by encrypting the first verification code (hereinafter referred to as a first encrypted data) through the LF band electrical wave (t15). The key-side first reception processor 252 receives the first verification code and the first encrypted data (t16).

The first verification code corresponds to a first data according to the present disclosure. The first encrypted data corresponds to a first encrypted data according to the present disclosure. The process performed at t15 corresponds to an onboard-side encrypted data transmitter according to the present disclosure. The process performed at t16 corresponds to an onboard-side encrypted data receiver according to the present disclosure. The first verification code may be an arbitrary code.

When the key-side first reception processor 252 receives the first verification code and the first encrypted data, the key-side first encryptor 256 encrypts the received first verification code using the secret key generated by the key-side secret key generation portion 255 (t17). The key-side agreement determinator 258 of the electronic key 20 determines whether the data obtained by encrypting the first verification code in the key-side first encryptor 256 matches the first encrypted data received by the key-side first reception processor 252 (t18). The key-side agreement determinator 258 corresponds to a portable-apparatus-side agreement determinator according to the present disclosure.

When the key-side agreement determinator 258 determines that the agreement is unsuccessful (at t18, NO), the processing returns to repeat the processes at t1. For example, when the key-side agreement determinator 258 determines that the agreement is not achieved, the key-side first transmission processor 251 may transmit a signal indicative of an unsuccessful agreement in the key-side agreement determinator 258 to the vehicle-side first reception processor 152. Based on the signal, the vehicle-side controller 15 may return to repeat the processes at t1.

When the key-side agreement determinator 258 determines that the agreement is successful (at t18, YES), the key-side first encryptor 256 encrypts a predetermined code for verification (hereinafter referred to as a second verification code) by using the secret key generated by the key-side secret key generation portion 255. The key-side first transmission processor 251 transmits the second verification code and data obtained by encrypting the second verification code (hereinafter referred to as a second encrypted data) through the LF band electrical wave (t19). The vehicle-side first reception processor 152 receives the second verification code and the second encrypted data (t20).

The second verification code corresponds to a second data according to the present disclosure. The second encrypted data corresponds to second encrypted data according to the present disclosure. The process performed at t19 corresponds to a portable-apparatus-side encrypted data transmitter according to the present disclosure. The process performed at t20 corresponds to a portable-apparatus-side encrypted data receiver according to the present disclosure. The second verification code may be an arbitrary code or identical with the first verification code.

When the vehicle-side first reception processor 152 receives the second verification code and the second encrypted data, the vehicle-side first encryptor 156 encrypts the received second verification code by using the secret key generated by the vehicle-side secret key generation portion 155 (t21). The vehicle-side agreement determinator 158 of the BCM 10 determines whether data obtained by encrypting the second verification code in the vehicle-side first encryptor 156 matches the second encrypted data received by the vehicle-side first reception processor 152 (t22). The vehicle-side agreement determinator 158 corresponds to an onboard-side agreement determinator according to the present disclosure.

When the vehicle-side agreement determinator 158 determines that the agreement is unsuccessful (at t22, NO), the processing returns to repeat the processes at t1. When the vehicle-side agreement determinator 158 determines that the agreement is successful (at t22, YES), the registration permission portion 159 of the BCM 10 permits the electronic key 20 to be registered as the electronic key 20 of an authorized user (t23).

When the registration is permitted by the registration permission portion 159, the vehicle-side first transmission processor 151 transmits a signal indicative of registration permission (hereinafter referred to as a registration permission notification) through the LF band electrical wave (t24). The key-side first reception processor 252 receives the registration permission notification (t25). When the registration is permitted by the registration permission portion 159, the vehicle-side registration portion 160 of the BCM 10 performs a registration process (t26) and terminates the process.

In the registration process at t26, the secret key generated by the vehicle-side secret key generation portion 155 is stored, for example, in the non-volatile memory of the vehicle-side controller 15 as the secret key that is used in wireless communication between the BCM 10 and the electronic key 20 whose registration is permitted. The vehicle-side registration portion 160 of the BCM 10 stores the second code received by the vehicle-side first reception processor 152 in the non-volatile memory of the vehicle-side controller 15 as an ID code for the electronic key 20 whose registration is permitted.

Incidentally, a code other than the second code may be stored as the ID code for the electronic key 20 whose registration is permitted. The electronic key 20 for which the second code is stored in the non-volatile memory of the vehicle-side controller 15 is registered in the BCM 10 as the electronic key 20 of an authorized user.

When the key-side first reception processor 252 receives the registration permission notification, the key-side registration portion 260 of the electronic key 20 performs the registration process (t27), and then terminates the process. In the registration process at t27, the secret key generated by the key-side secret key generation portion 255 is stored, for example, in the non-volatile memory of the key-side controller 25 as the secret key for use in wireless communication between the BCM 10 and the electronic key 20 whose registration is permitted. When the registration process at t27 is completed, the first code temporarily stored in the key-side temporary storage 259 may be erased. When the determination by the key-side agreement determinator 258 is ended, the first code stored in the key-side temporary storage 259 may be erased before the completion of the registration process at t27.

An example of a smart function related process in the electronic key system 100 will be described with reference to the flowchart of FIG. 7. The process illustrated in the flowchart of FIG. 7 may be started each fixed time or upon receipt of a signal transmitted when a smart function related switch on the electronic key 20 is operated.

In step S31, the vehicle-side first encryptor 156 of the BCM 10 encrypts a signal to be transmitted through the LF band electrical wave (that is, an LF command) by the first cryptographic algorithm through the use of the secret key registered in the vehicle-side registration portion 160. Upon completion of step S31, the processing proceeds to step S32.

The LF command is, for example, a signal that requests the electronic key 20 to transmit the ID code.

In step S32, the vehicle-side second transmission processor 153 of the BCM 10 transmits the LF command encrypted in step S31 through the LF band electrical wave through the smart transmitter 13 and the second LF transmission antenna 13a. Upon completion of step S32, the processing proceeds to step S33.

In step S33, the key-side second reception processor 254 of the electronic key 20 receives the LF command transmitted in step S32 through the second LF reception antenna 23a and the smart receiver 23. Upon completion of step S33, the processing proceeds to step S34.

In step S34, the key-side first decryptor 257 of the electronic key 20 decrypts the LF command received in step S33 by the first cryptographic algorithm through the use of the secret key registered in the key-side registration portion 260. Upon completion of step S34, the processing proceeds to step S35.

In step S35, the processing is performed in compliance with a request from the LF command, which is decrypted in step S34. More specifically, the key-side first encryptor 256 encrypts an ID code (that is, an RF command) for the electronic key 20, which is to be transmitted through UHF band electrical wave, by the first cryptographic algorithm through the use of the secret key registered in the key-side registration portion 260. Upon completion of step S35, the processing proceeds to step S36. The present embodiment is to be described on the assumption that, for example, the second code is used as the ID code.

In step S36, the key-side second transmission processor 253 of the electronic key 20 transmits the RF command encrypted in step S35 through the UHF band electrical wave through the smart transmitter 24 and the RF transmission antenna 24a. Upon completion of step S36, the processing proceeds to step S37.

In step S37, the vehicle-side second reception processor 154 of the BCM 10 receives the RF command transmitted in step S36 through the RF reception antenna 14a and the smart receiver 14. Upon completion of step S37, the processing proceeds to step S38.

In step S38, the vehicle-side first decryptor 157 of the BCM 10 decrypts the RF command received in step S37 by the first cryptographic algorithm through the use of the secret key registered in the vehicle-side registration portion 160. Upon completion of step S38, the processing proceeds to step S39.

In step S39, the vehicle-side agreement determinator 158 determines whether the ID code derived from the RF command decrypted in step S38 agrees with the ID code for the electronic key 20, which is registered in the vehicle-side registration portion 160. In the present embodiment, it is determined whether the second code derived from the RF command agrees with the second code for the electronic key 20, which is registered in the vehicle-side registration portion 160.

When the result of determination indicates that the agreement is successful (in step S39, YES), the processing proceeds to step S40. When it is determined that the agreement is unsuccessful (in step S39, NO), the processing returns to repeat steps S32. If the processing returns to repeat steps S32, the processing may terminate when the number of times of repetition exceeds a predetermined value.

When a plurality of electronic keys 20 are registered in the BCM 10 and the secret keys for the electronic keys 20 are registered in the vehicle-side registration portion 160, LF commands encrypted by the secret keys may be successively transmitted. The electronic key 20 may check the transmitted LF commands to select an LF command that can be decrypted by a secret key registered in the key-side registration portion, and then use the selected LF command for processing purposes. The BCM 10 may check the RF commands transmitted from the electronic key 20 to select an RF command that can be decrypted by a secret key registered in the vehicle-side registration portion 160, and use the selected RF command for processing purposes.

Figure 7:
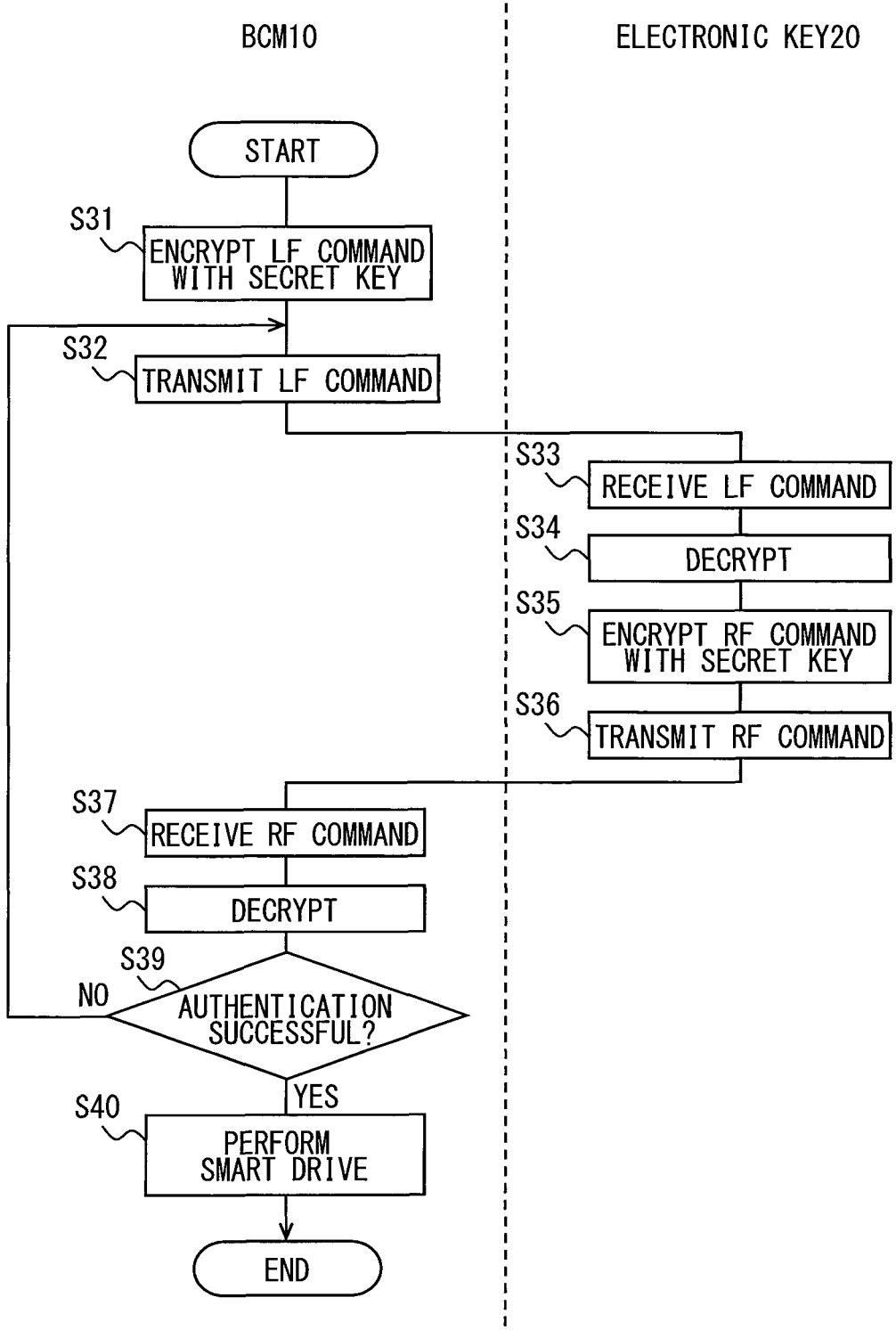
FIG. 7 is a flowchart illustrating an example of a smart function related process in the electronic key system.

In step S40, the smart drive instructor 161 causes the electronic key system 100 to perform the smart drive, and terminates the process illustrated in the flowchart of FIG. 7. When, for example, a predetermined period of time has not elapsed after the vehicle-side controller 15 receives a signal indicative of an operation performed on the door switch 31, the door lock-and-unlock unit 34 is instructed to lock a door. In compliance with the instruction for locking the door, the door lock-and-unlock unit 34 locks the door of the vehicle by driving an actuator for locking the doors of the vehicle. Alternatively, the smart drive may be performed not only to lock the vehicle door but also to permit, for example, an engine of the vehicle to start up.

Figure 8:
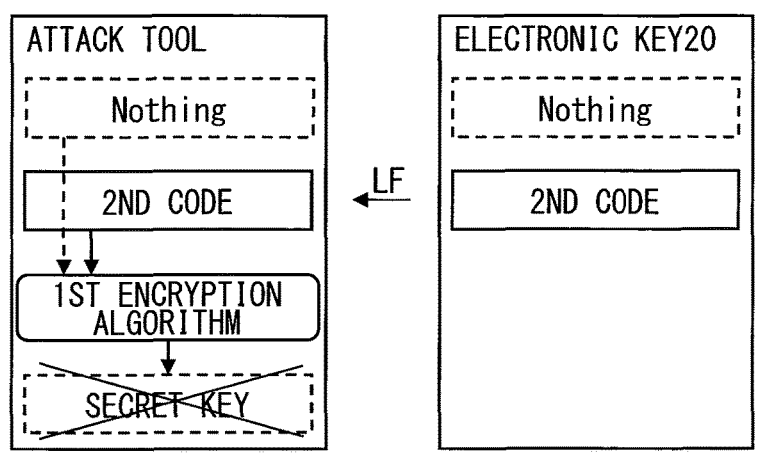
FIG. 8 is a diagram schematically illustrating an effect by a configuration according to the first embodiment.

According to the configuration of the first embodiment, the second code unique to the electronic key 20 and the first code unique to the BCM 10 are both used to generate a secret key. Therefore, the secret key remains unknown until the first code and the second code are both acquired. Further, the electronic key 20 transmits the second code only, and does not transmit the first code. Therefore, as illustrated in FIG. 8, even when an unauthorized user acquires the second code transmitted from the electronic key 20 by using an attack tool, the unauthorized user cannot acquire the first code. Consequently, even when an unauthorized user uses an attack tool, the unauthorized user can acquire the second code only and cannot acquire the secret key. An unauthorized electronic key 20 cannot be registered.

The first code is stored in the key-side temporary storage 259 of the electronic key 20 until, at the latest, the execution of a registration process in the key-side registration portion 260. Therefore, the first code cannot be acquired from the electronic key 20 after the registration of the electronic key 20. It may be possible to improve the security of the electronic key system 100.

According to the configuration of the first embodiment, it may be possible to use an existing transponder communication scheme, so that the electronic key 20 acquires the first code from the BCM 10. Besides, a configuration for generating the secret key by using both the first code and the second code can easily be implemented by applying BCM 10 and electronic key 20 software changes to a conventional configuration. Thus, it may be possible to increase security while suppressing changes in parts of the electronic key 20.

The following alternative configuration (hereinafter referred to as a first modification) may be used so to further increase the security. In the first modification, the first code stored in the key-side temporary storage 259 may be used as the secret key to let the key-side second encryptor 261 of the electronic key 20 encrypt the second code. This encryption is performed by using a cryptographic algorithm (hereinafter referred to as a second cryptographic algorithm) different from the first cryptographic algorithm. Thus, the second cryptographic algorithm corresponds to a different algorithm according to the present disclosure, and the key-side second encryptor 261 corresponds to an encryptor according to the present disclosure. The key-side first transmission processor 251 may transmit the encrypted second code.

In the first modification, the vehicle-side second decryptor 162 of the BCM 10 may decrypt the encrypted second code received in the process at t12 according to the second cryptographic algorithm by using the first code of the BCM 10 as the secret key. Thus, the vehicle-side second decryptor 162 corresponds to a decryptor according to the present disclosure.

According to the configuration of the first modification, since the second code can be encrypted before being transmitted from the electronic key 20 to the BCM 10, it may be possible to further increase the security.

(Second Embodiment)

Figure 9:
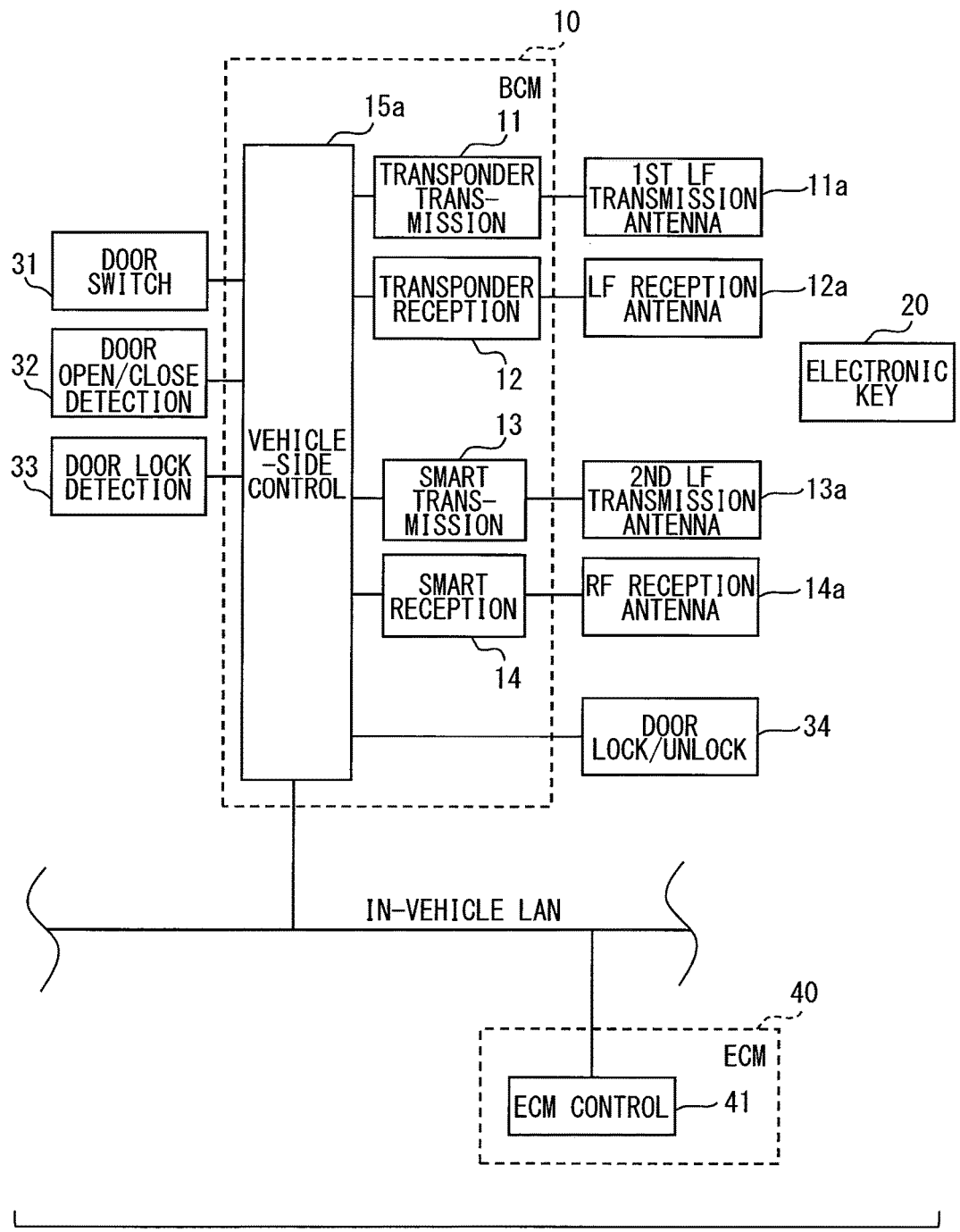
FIG. 9 is a diagram schematically illustrating an exemplary configuration of the electronic key system.

An embodiment of the present disclosure has been described. The present disclosure is not limited to the first embodiment, which is described above. A second embodiment is included in the technical scope of the present disclosure. The second embodiment will be described with reference to the drawings. FIG. 9 is a schematic diagram illustrating an exemplary configuration of an electronic key system 200 to which the present disclosure is applied. For the sake of convenience of explanation, members having the same function as the members depicted in the figures used to describe the first embodiment will be designated by the same reference numerals as their counterparts and will not be redundantly described.

The electronic key system 200 according to the second embodiment has the same configuration as the electronic key system 100 according to the first embodiment except that the former generates a secret key by using a code of an onboard apparatus other than the BCM 10 in addition to the first code of the BCM 10 and the second code of the electronic key 20.

The electronic key system 200 illustrated in FIG. 9 includes an engine control unit mounted to a vehicle (hereinafter referred to as an ECM) 40 in addition to the BCM 10 and the electronic key 20.

The ECM 40 is electrically connected to the BCM 10 through, for example, an in-vehicle LAN. The ECM 40 includes an ECM controller 41. The ECM controller 41 includes, as a main body, a microcomputer that includes a CPU, a ROM, a RAM, a backup RAM, and an I/O device (these components are not shown). The ECM controller 41 performs various processes by executing various control programs stored in the ROM. The ECM 40 corresponds to a different apparatus (or referred to as another apparatus). In the present disclosure, the different apparatus (or another apparatus) is a vehicle mounted apparatus (or instrument) other than the BCM 10.

A non-volatile memory such as a ROM and a backup RAM in the ECM controller 41 stores an ID code (hereinafter referred to as a third code) unique to the ECM 40. The ECM controller 41 corresponds to a different-apparatus-side storage (or a different-apparatus-side storage) 42 according to the present disclosure.

Figure 10:
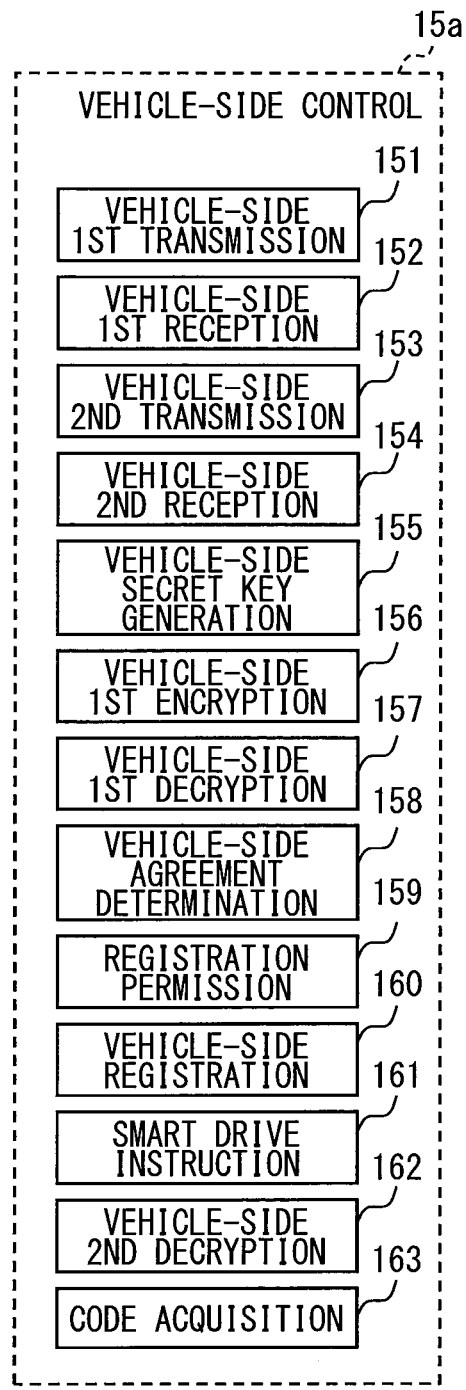
FIG. 10 is a functional block diagram schematically illustrating an exemplary configuration of the vehicle-side controller.

The BCM 10 according to the second embodiment includes a vehicle-side controller 15a instead of the vehicle-side controller 15 according to the first embodiment. As illustrated in FIG. 10, the vehicle-side controller 15a is similar to the vehicle-side controller 15 except that the former includes a code acquisition portion 163.

Figure 11:
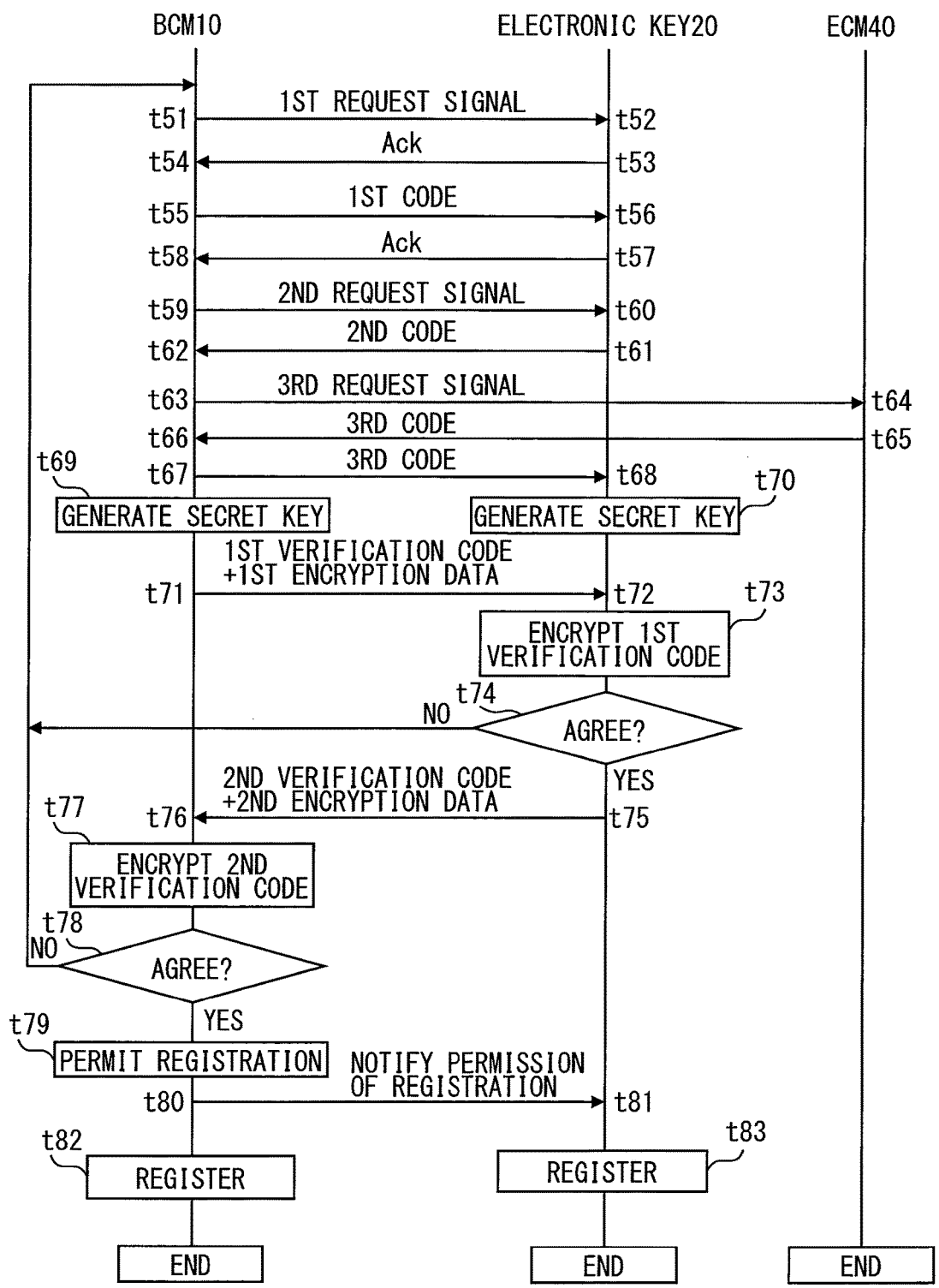
FIG. 11 is a sequence diagram illustrating an example of the registration related process according to a second embodiment.

An example of the registration related process according to the second embodiment will be described with reference to the sequence diagram of FIG. 11. The example of FIG. 11 will be described on the assumption that registration is permitted by using an already registered electronic key 20 or by using a dedicated tool. The registration related process illustrated in FIG. 11 is applicable not only to a case where the electronic key 20 is to be additionally registered, but also to a case where the electronic key 20 is to be initially registered.

The processes performed between t51 and t62 are the same as the processes performed between t1 and t12. Thus, the process at t55 also corresponds to the onboard code transmitter of the present disclosure. The process at t56 also corresponds to the onboard code receiver of the present disclosure. When the vehicle-side first reception processor 152 receives the second code, the code acquisition portion 163 transmits a request signal (hereinafter referred to as the third request signal) to the ECM 40 through the in-vehicle LAN (t63). The ECM controller 41 of the ECM 40 receives the third request signal (t64).

Upon receipt of the third request signal, the ECM controller 41 reads the third code, which is an ID code unique to the ECM 40, from a non-volatile memory in the ECM controller 41, and transmits the third code to the BCM 10 through the in-vehicle LAN (t65). The code acquisition portion 163 receives and acquires the third code (t66). Thus, the code acquisition portion 163 corresponds to a different apparatus unique code acquisition portion (or another apparatus unique code acquisition portion) according to the present disclosure.

When the code acquisition portion 163 receives the third code, the vehicle-side first transmission processor 151 transmits the third code received in the process at t66 through the LF band electrical wave (t67). Thus, the third code corresponds to a different apparatus unique code (or another apparatus unique code) according to the present disclosure, and the process at t67 corresponds to the onboard code transmitter according to the present disclosure. The key-side first reception processor 252 receives the third code (t68). The process at t68 also corresponds to the onboard code receiver according to the present disclosure.

The third code received by the key-side first reception processor 252 is temporarily stored in the key-side temporary storage 259 of the electronic key 20.

When the vehicle-side first transmission processor 151 transmits the third code, the vehicle-side secret key generation portion 155 generates a secret key by the first cryptographic algorithm from the second code received by the vehicle-side first reception processor 152, the third code acquired in the process at t66, and the first code stored in the non-volatile memory of the vehicle-side controller 15 (t69).

The key-side secret key generation portion 255 of the electronic key 20 generates a secret key by the first cryptographic algorithm from the first and third codes temporarily stored in the key-side temporary storage 259 and the second code stored in the non-volatile memory of the key-side controller 25 (t70).

Figure 12:
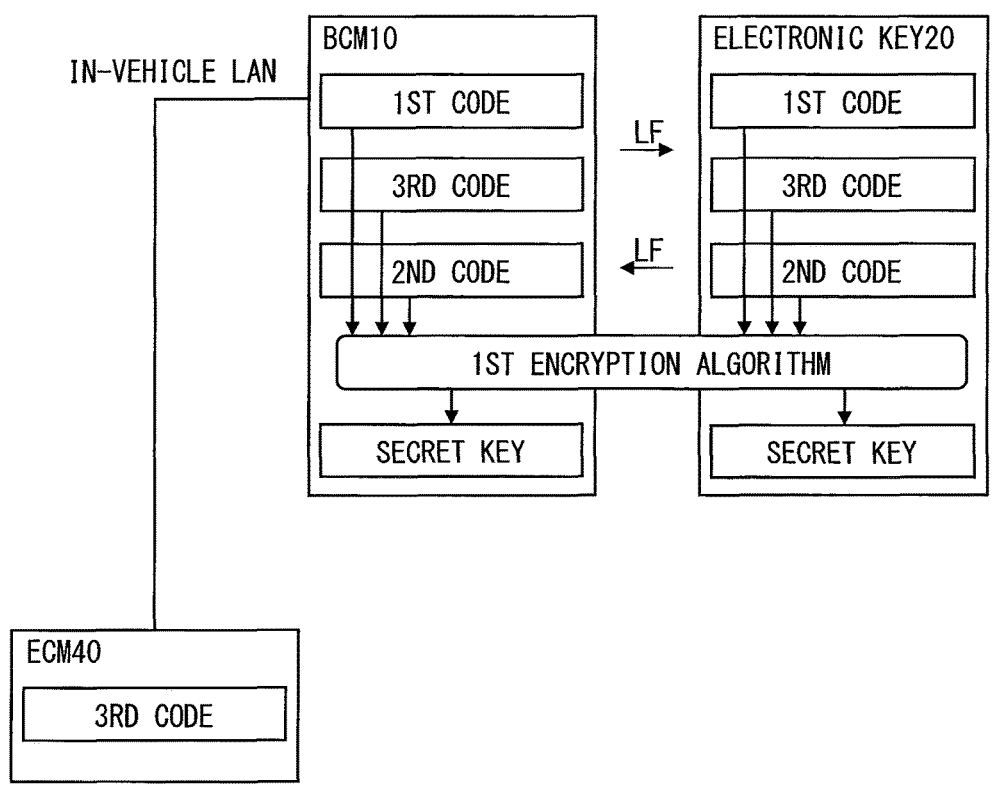
FIG. 12 is a diagram schematically illustrating an example of a secret key generation by the BCM and electronic key according to the second embodiment.

As illustrated in FIG. 12, the BCM 10 and the electronic key 20 each generate a secret key by the common first cryptographic algorithm through the use of the first code unique to the BCM 10, the second code unique to the electronic key 20, and the third code unique to the ECM 40. FIG. 12 is a schematic diagram illustrating an example of secret key generation by the BCM 10 and electronic key 20 according to the second embodiment.

The processes performed between t71 and t83 are the same as the above processes performed between t15 and t26. In the second embodiment, the third code unique to the ECM 40 is also used for secret key generation. Therefore, the second embodiment provides higher security than the first embodiment.

The second embodiment has been described on the assumption that the BCM 10 and the ECM 40 are connected through the in-vehicle LAN. However, the present disclosure is not limited to such a configuration. For example, an onboard apparatus other than the BCM 10 that uses a code for secret key generation may be connected by direct wiring to the BCM 10.

In the second embodiment, one onboard apparatus is used as onboard apparatus other than the BCM 10 that uses a code for secret key generation. The present disclosure is not limited to such a configuration. For example, codes of two or more onboard apparatuses may be used.

The second embodiment has been described on the assumption that an ID code (that is, the first code) unique to the BCM 10 is used for secret key generation. However, the present disclosure is not limited to such a configuration. For example, secret key generation may alternatively be achieved by using an ID code (that is, the third code) unique to the ECM 40 instead of the first code. When this alternative scheme is used, the second and third codes are used for secret key generation. Further, in the above case, the BCM 10 may alternatively be without an ID code unique to the BCM 10.

In the foregoing embodiments, the term "portion" is used to represent internal portions of a controller that are classified according to functionality. It does not signify that the inside of the controller is physically divided into portions corresponding to individual internal units. Thus, each portion can be implemented by software such as a part of a computer program or implemented by hardware such as an IC chip or a large-scale integrated circuit.

Each flowchart provided in the present application or a process indicated in each flowchart is formed of a plurality of sections (which may be referred to as steps). The sections are each expressed, for example, as S31. Each section may be divided into a plurality of subsections. Meanwhile, a plurality of sections may be combined into one section. Each of the sections configured as described above may be referred to as a device, a module, or a means.

Each of the above sections or a combination of the above sections may include or exclude the functions of a related apparatus and may be implemented as (i) a section of software combined with a hardware unit (for example, a computer) or as (ii) a section of hardware (for example, an integrated circuit or a hard-wired logic circuit). Further, a section of hardware may be configured in a microcomputer.

An electronic key system according to one aspect of the present disclosure includes an onboard apparatus and a portable apparatus. The onboard apparatus is mounted to a vehicle. The portable apparatus is carried by a user. The electronic key system establishes wireless communication between the onboard apparatus and the portable apparatus by using a common secret key and authenticates the portable apparatus registered as a portable apparatus of an authorized user. The portable apparatus includes a portable apparatus code transmitter that transmits a portable apparatus code, which is unique to the portable apparatus, to the onboard apparatus. The onboard apparatus includes an onboard code transmitter that transmits an onboard code, which is different from the portable apparatus code, to the portable apparatus. The onboard apparatus further includes a portable apparatus code receiver and an onboard-side key generation portion. The portable apparatus code receiver receives the portable apparatus code transmitted from the portable apparatus code transmitter of the portable apparatus when the portable apparatus of an authorized user is to be registered. The onboard-side key generation portion generates the secret key by a cryptographic algorithm common to the portable apparatus through the use of the onboard code and the portable apparatus code received by the portable apparatus code receiver. The portable apparatus further includes an onboard code receiver and a portable-apparatus-side key generation portion. The onboard code receiver receives the onboard code transmitted from the onboard code transmitter of the onboard apparatus when the portable apparatus of an authorized user is to be registered. The portable-apparatus-side key generation portion generates the secret key by the cryptographic algorithm common to the onboard apparatus through the use of the portable apparatus code and the onboard code received by the onboard code receiver.

As described above, the secret key is generated by using both the portable apparatus code of the portable apparatus and the onboard code of the onboard apparatus. Therefore, the secret key remains unknown until the portable apparatus code and the onboard code are both acquired. Besides, the portable apparatus transmits only the portable apparatus code and not the onboard code. Therefore, an unauthorized user cannot acquire the onboard code even when the unauthorized user uses an attack tool to acquire the portable apparatus code transmitted from the portable apparatus. Consequently, even when an unauthorized user uses an attack tool, the unauthorized user can acquire the portable apparatus code only. Hence, the unauthorized user cannot acquire the secret key. Without the secret key, the unauthorized user cannot register an illegal portable apparatus.

A configuration for enabling the portable apparatus to receive the onboard code and generate the secret key by using both the portable apparatus code and the onboard code can easily be implemented by applying onboard apparatus and portable apparatus software changes to a conventional configuration. This makes it possible to provide increased security while suppressing changes in parts of the portable apparatus.

Moreover, the present disclosure provides the onboard apparatus and the portable apparatus that are used in the electronic key system. It may be possible to improve security while suppressing changes in the parts of the portable apparatus.

The present disclosure is not limited to the above embodiments. The present disclosure covers variously modified embodiments as far as they are within the scope of the present disclosure. An embodiment obtained by appropriately combining technical means disclosed by different embodiments is also included within the technical scope of the present disclosure.

While various embodiments, configurations, and aspects of the present disclosure have been exemplified, the embodiments, configurations, and aspects of the present disclosure are not limited to those described above. For example, embodiments, configurations, and aspects obtained from an appropriate combination of technical elements disclosed in different embodiments, configurations, and aspects are also included within the scope of the embodiments, configurations, and aspects according to the present disclosure.

What is claimed is:

1. An electronic key system comprising:
an onboard apparatus that is mounted to a vehicle; and
a portable apparatus that is carried by a user,
wherein:
the electronic key system establishes wireless communication with a secret key common to the onboard apparatus and the portable apparatus, and authenticates the portable apparatus registered as the portable apparatus of an authorized user through wireless communication;
the portable apparatus includes a portable apparatus code transmitter that transmits to the onboard apparatus a portable apparatus code unique to the portable apparatus when the portable apparatus of the authorized user is to be registered;
the onboard apparatus includes an onboard code transmitter that transmits to the portable apparatus, an onboard apparatus unique code as an onboard code different from the portable apparatus code when the portable apparatus of the authorized user is to be registered, wherein the onboard apparatus unique code is a code unique to the onboard apparatus;
the onboard apparatus further includes
a portable apparatus code receiver that receives the portable apparatus code transmitted from the portable apparatus code transmitter of the portable apparatus when the portable apparatus of the authorized user is to be registered, and
an onboard-side key generation portion that generates the secret key by a cryptographic algorithm common to the portable apparatus while using the onboard apparatus unique code and the portable apparatus code received by the portable apparatus code receiver; and
the portable apparatus further includes
an onboard code receiver that receives the onboard apparatus unique code from the onboard code transmitter when the portable apparatus of the authorized user is to be registered,
a portable-apparatus-side key generation portion that generates the secret key by the cryptographic algorithm common to the onboard apparatus while using the portable apparatus code and the onboard apparatus unique code received by the onboard code receiver, and
a temporary storage that temporarily stores the onboard apparatus unique code received by the onboard code receiver;
the temporary storage erases the onboard apparatus unique code which is temporarily stored, when, at a latest, the portable apparatus of the authorized user is completely registered; and
the portable apparatus only transmits the portable apparatus code.

2. The electronic key system according to claim 1, further comprising:
at least one different apparatus other than the onboard apparatus, the different apparatus being mounted to the vehicle and communicatively connected to the onboard apparatus,
wherein:
the different apparatus includes a different-apparatus-side storage that stores a different apparatus unique code, which is a code unique to the different apparatus;
the onboard apparatus further includes a different apparatus unique code acquisition portion that acquires the different apparatus unique code of the different apparatus;
the onboard code transmitter not only transmits the onboard apparatus unique code as the onboard code, but also transmits the different apparatus unique code acquired by the different apparatus unique code acquisition portion as the onboard code;
the onboard-side key generation portion generates the secret key by the cryptographic algorithm common to the portable apparatus through the onboard apparatus unique code serving as the onboard code, the different apparatus unique code acquired by the different apparatus unique code acquisition portion as the onboard code, and the portable apparatus code received by the portable apparatus code receiver;

when the portable apparatus of the authorized user is to be registered, the onboard code receiver of the portable apparatus receives the different apparatus unique code and the onboard apparatus unique code transmitted from the onboard code transmitter of the onboard apparatus as the onboard code; and the portable-apparatus-side key generation portion generates the secret key by the cryptographic algorithm common to the onboard apparatus from the portable apparatus code, the different apparatus unique code, and the onboard apparatus unique code, which are received as the onboard code by the onboard code receiver.

3. The electronic key system according to claim 1, wherein:

the onboard apparatus further includes an onboard-side encrypted data transmitter that transmits a predetermined first data and a first encrypted data to the portable apparatus, the first encrypted data being obtained by encrypting the first data with the secret key generated by the onboard-side key generation portion;

the portable apparatus further includes an onboard-side encrypted data receiver that receives the first data and the first encrypted data from the onboard-side encrypted data transmitter, a portable-apparatus-side agreement determinator that determines whether data obtained by encrypting the first data received by the onboard-side encrypted data receiver with the secret key generated by the portable-apparatus-side key generation portion agrees with the first encrypted data received by the onboard-side encrypted data receiver, and a portable-apparatus-side encrypted data transmitter that transmits a predetermined second data and a second encrypted data to the onboard apparatus, the second encrypted data being obtained by encrypting the second data with the secret key generated by the portable-apparatus-side key generation portion; and the onboard apparatus further includes a portable-apparatus-side encrypted data receiver that receives the second data and the second encrypted data from the portable-apparatus-side encrypted data transmitter, an onboard-side agreement determinator that determines whether data obtained by encrypting the second data received by the portable-apparatus-side encrypted data receiver with the secret key generated by the onboard-side key generation portion agrees with the second encrypted data received by the portable-apparatus-side encrypted data receiver, and a registration permission portion that, when the portable apparatus of the authorized user is to be registered and when both the portable-apparatus-side agreement determinator and the onboard-side agreement determinator have determined that agreement is successful, permits the portable apparatus of the authorized user to be registered.

4. The electronic key system according to claim 1, wherein:

the portable apparatus further includes an encryptor that encrypts the portable apparatus code by a different algorithm by using the onboard code received by the onboard code receiver as an other secret key different from the secret key, the different algorithm being different from the cryptographic algorithm and being an other cryptographic algorithm common to the onboard apparatus;

the portable apparatus code transmitter transmits the portable apparatus code encrypted by the encryptor to the onboard apparatus; and the onboard apparatus further includes a decryptor that decrypts the portable apparatus code encrypted by the encryptor and received by the portable apparatus code receiver by the different algorithm by using the onboard code as the secret key.

5. An onboard apparatus that is mounted to a vehicle comprising:

an onboard code transmitter that transmits to a portable apparatus, an onboard apparatus unique code as an onboard code different from a portable apparatus code when the portable apparatus of an authorized user is to be registered, in which the onboard apparatus unique code is a code unique to the onboard apparatus;

a portable apparatus code receiver that receives the portable apparatus code transmitted from a portable apparatus code transmitter of the portable apparatus when the portable apparatus of the authorized user is to be registered; and an onboard-side key generation portion that generates a secret key by a cryptographic algorithm common to the portable apparatus while using the onboard apparatus unique code and the portable apparatus code received by the portable apparatus code receiver, wherein:

an electronic key system including the onboard apparatus and the portable apparatus establishes wireless communication with the secret key common to the onboard apparatus and the portable apparatus, and authenticates the portable apparatus registered as the portable apparatus of the authorized user through the wireless communication;

the onboard code transmitter is mounted in the vehicle; and the onboard code transmitter performs wireless communication with the portable apparatus.

6. A portable apparatus that is carried by a user comprising:

a portable apparatus code transmitter that transmits to an onboard apparatus a portable apparatus code unique to the portable apparatus when the portable apparatus of an authorized user is to be registered;

an onboard code receiver that receives an onboard apparatus unique code from an onboard code transmitter when the portable apparatus of the authorized user is to be registered;

a portable-apparatus-side key generation portion that generates a secret key by a cryptographic algorithm common to the onboard apparatus while using the portable apparatus code and the onboard apparatus unique code received by the onboard code receiver; and a temporary storage that temporarily stores the onboard apparatus unique code received by the onboard code receiver, wherein:

the temporary storage erases the onboard apparatus unique code which is temporarily stored, when, at a latest, the portable apparatus of the authorized user is completely registered;

the portable apparatus only transmits the portable apparatus code; and an electronic key system including the onboard apparatus and the portable apparatus establishes wireless communication with the secret key common to the onboard apparatus and the portable apparatus, and authenticates the portable apparatus registered as the portable apparatus of the authorized user through the wireless communication.

* * * * *